3,185,670
PRESSURE ESTERIFICATION
Aubrey R. McKinney, Hammond, Ind., assignor to Standard Oil Company, Chicago, Ill., a corporation of Indiana
No Drawing. Filed Aug. 31, 1959, Ser. No. 836,904
12 Claims. (Cl. 260—75)

This invention relates to the direct esterification of terephthalic acid and mixtures of terephthalic acid containing up to about 35% by weight of isophthalic acid with a diol to provide an ester product which is suitable for conversion to high molecular weight linear polyesters under reduced pressure and elevated temperature. This invention also relates to the preparation of high molecular weight linear condensation polyesters which are capable of being drawn to pliable, strong fibers or into oriented films, or other extruded or molded forms.

Synthetic linear condensation polyesters derived from diols and terephthalic acid, as well as diols and mixtures of terephthalic acid containing up to about 35% by weight isophthalic acid, which are capable of being drawn into pliable, strong fibers or films having oriented crystalline structures are well known. These polyesters have proven to be of considerable commercial value. In general, these polyesters are formed from an ester product of terephthalic acid and mixtures of terephthalic acid containing up to about 35% by weight isophthalic acid and a polyol containing from 2 to 10 carbon atoms. These diols are of the general formula HO—A—OH wherein A may be the linear hydrocarbon chain containing from 2 to 10 methylene groups or A may be a hydrocarbon containing a saturated ring as in the bis-methylol cyclohexanes, especially the 1,4 isomer, or A may be a hydrocarbon containing a benzene ring as in bis-methylol benzenes, $\alpha,\alpha'$-dihydroxy xylenes, especially terephthalyl alcohol. Specific high molecular weight linear polyesters which have attained commercial prominence are polyethylene terephthalate, polyesters derived by co-condensing ethylene glycol derivatives of terephthalic and isophthalic acids and polyesters obtained from the bis-methylol cyclohexane esters of isophthalic acid and/or terephthalic acid. In general, the high molecular weight linear polyesters are obtained by the polycondensation or polymerization of what has been sometimes referred to as a monomer ester under reduced pressure and at elevated temperatures. The monomer ester formed contains hydroxy ester groups as in the bis-2-hydroxyethyl terephthalates and isophthalates and the bis (methylol cyclohexyl) terephthalates and isophthalates. The conversion of these hydroxy ester group containing monomers to the high molecular weight linear polyesters under reduced pressure and at elevated temperature is accompanied by splitting out the diol employed to form the ester monomer. The polymerization or polycondensation process has been generally carried out in the presence of a catalyst. The literature is replete with proposed polymerization or polycondensation catalysts. The literature also contains reference to the polycondensation or polymerization of the hydroxy ester group containing monomer in the absence of a catalyst. Although polyesters of suitable high molecular weight can be obtained, they are only obtained after excessively long polycondensation or polymerization reactions with result in a dark-colored product lacking uniform properties. The use of the various polymerization or polycondensation catalysts is said to reduce the time required to produce suitable high molecular weight polyesters of light color and uniform properties.

The art has long been aware that the hydroxy ester group containing monomers can be directly prepared by reacting the diol with terephthalic acid and terephthalic acid containing up to about 35% by weight isophthalic acid. For example, British Patent 578,079 describes the esterification of terephthalic acid with ethylene glycol by refluxing the mixture. However, substantially complete esterification is only accomplished after about 72 hours' reaction time. Commercially, the hydroxy ester group containing monomers are prepared indirectly by a transesterification process involving the reaction of the diol with a dialkyl ester of terephthalic acid or mixtures containing dialkyl esters of terephthalic acid and dialkyl esters of isophthalic acid. In commercial practice dimethyl terephthalate and mixtures thereof with dimethyl isophthalate are employed in the transesterification process. Even here, to avoid excessive reaction conditions and excessively long reaction times transesterification catalysts are employed. Many transesterification catalysts have been proposed and are described in the literature. These transesterification catalysts include litharge, lithium hydride, a combination of lithium hydride and zinc acetate, among many others. Another reason for employing the indirect route to the monomer ester was that terephthalic acid of sufficient high purity was unobtainable per se. To obtain a highly pure form of terephthalic acid it was necessary to prepare a readily purifiable form. The lower dialkyl esters, such as dimethyl terephthalate, were found to be suitable derivatives to satisfy the need for a highly pure form of terephthalic acid. These esters can be purified by techniques readily adaptable to commercial practice including recrystallization and fractionation.

Numerous processes for the preparation of the hydroxy ester group containing monomer by direct reaction of terephthalic acid with the diol have been proposed. For example, in British Patent 777,628 it is proposed that the reaction between terephthalic acid and the diol be carried out at superatmospheric pressure and that temperatures above the normal boiling point of the glycol be employed. This patent discloses that as the reaction proceeds the pressure increases due to the formation of water by the esterification reaction and the pressure is reduced periodically by bleeding off a portion of the vapors from the reactor to maintain a predetermined pressure. When such a process is carried out at 230° C. in a stirred autoclave maintained at 35 p.s.i. pressure with a frequent bleed off of pressure to maintain the 35 p.s.i., the reaction between terephthalic acid and ethylene glycol is said to be completed in about 2½ to 3 hours. When the pressure is maintained at 50 p.s.i. by the frequent bleeding off of steam from vapors from the reactor and the pressure is dropped to about 1 atmosphere after 70% esterification is obtained, complete esterification is accomplished in about one hour. Other direct reactions between the diol and terephthalic acid involve the use of large excesses of the diol, more than 10 moles per mole of acid, as well as complicated procedures for separating the useful monomeric diester and monodiol acid ester from reaction products containing low molecular weight polymers, some of which contain ether linkages. Still another direct esterification process involves the addition of a small amount of preformed low molecular weight polymer of the diol terephthalate to a mixture of the diol and terephthalic acid and heating this mixture at a temperature above the normal boiling point of the glycol, generally at elevated pressures. Such a process is actually one of autocatalysis wherein the preformed low molecular weight operates as a catalyst. One precaution in the preparation of the high molecular weight linear polyester is to avoid conditions which favor the formation of polymeric material containing ether linkages. One drawback of the autocatalytic process for the direct esterification employing preformed low molecular weight polymer is that this polymer can introduce ether linkages in the final product. The difficulties in the polycondensation or polymerization process arising from ether linkage formation are difficult in and of themselves to overcome without introducing a potential ether linkage contaminant in the preparation of a monomer ester.

Although the process of British Patent 777,628 appears to have solved the direct esterification problem by employing superatmospheric pressure, the readily apparent drawback of bleeding off steam from the vapors to reduce the amount of steam in the gasiform mixture in the reaction vessel is the removal of some of the ethylene glycol which would also be present in the vapors since it has a boiling point of 197–200° C. Furthermore, in spite of the fact that this process has been available for a number of years, it has not been put into commercial practice.

From the foregoing it will be abundantly clear that a commercially adaptable process for the direct esterification of terephthalic acid and mixtures of terephthalic acid with isophthalic acid with the diol hereinbefore defined which will provide the hydroxy ester group containing monomer in a form and purity suitable for the preparation of high molecular weight linear polyesters would be highly desirable.

Such a direct esterification process has now been discovered for reacting terephthalic acid and terephthalic acid containing up to about 35% by weight isophthalic acid with a diol of the formula HO—A—OH wherein A is a divalent hydrocarbon group containing from 2 to 10 carbon atoms and being either an open chain divalent polymethylene group of 2 to 10 carbon atoms or a divalent hydrocarbon group containing a saturated or unsaturated ring as hereinbefore defined. This process involves reacting a mixture containing from 2 to 6 moles, preferably 3 to 5 moles of diol, for each mole of the phthalic acid under a superatmospheric imposed pressure, imposed by an inert oxygen-free gas, and at a temperature above the normal boiling point of the diol, preferably at 200 to 300° C. By normal boiling point of the diol as employed herein is meant the boiling point of the diol at atmospheric pressure. In this process the superatmospheric imposed pressure is maintained throughout the esterification reaction in a closed reaction system wherein by-product water is removed from the reaction mixture, preferably during the esterification reaction.

It is essential to the process of this invention to remove the esterification by-product water during the reaction, but the water need not be removed from the closed system as long as water is isolated from the reaction mixture. The reaction is continued under these conditions of temperature until the reaction mixture is a clear fluid wherein at least 50% and even as high as 99% of the total carboxyl groups of the terephthalic acid or mixture thereof with up to 35% isophthalic acid is converted to hydroxy ester groups

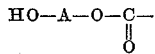

wherein A has the same meaning as hereinbefore designated. It is necessary to carry out this esterification reaction in the absence of oxygen to prevent the oxidation of the diol which would result in the formation of a dark-colored product and adversely affect the polyester produced therefrom.

In the process of this invention high purity terephthalic acid and high purity mixtures of terephthalic acid and isophthalic acid must be employed. By high purity is meant terephthalic acid and/or isophthalic acid having a carboxybenzaldehyde content of 0.5% by weight or below, a DMF color of 10 or below and a TEG color below 200, desirably 150 or lower and preferably 100 or less. The DMF color is determined by comparing against standard APHA colors (Hazen scale) a solution of 5 grams of the acid (terephthalic or isophthalic) in 100 milliliters of dimethyl formamide. The TEG color is determined by combining 4 grams of phthalic acid (terephthalic and/or isophthalic) with 28 milliliters of triethylene glycol by heating at 500° F. in a glass tube in an aluminum block with a purge of nitrogen for about one hour. The tube is removed. The contents are cooled to room temperature in about 30 minutes and diluted 1 to 1 with isopropyl alcohol. The color of the resulting solution is determined by comparison with standard APHA colors (Hazen scale).

Suitable diols of the formula hereinbefore set forth which are useful for the process of this invention include ethylene glycol, 1,3-trimethylene glycol, 1,4-tetramethylene glycol, 1,5-pentamethylene glycol, 1,6-hexamethylene glycol, 1,7-heptamethylene glycol, 1,8-octamethylene glycol, 1,9-nonamethylene glycol, 1,10-decamethylene glycol, cyclohexanedimethylol (1,4-dihydroxymethyl cyclohexane), p-cyclohexanediol (1,4-quinitol) and terephthalyl alcohol ($\alpha,\alpha'$-dihydroxy-p-xylene) among others. These diols have been previously disclosed as reactants generally with dimethyl terephthalate or isophthalate and/or terephthalyl chloride or isophthalyl chloride to form the corresponding di (hydroxyalkyl) or di (methylolphenyl) terephthalates or isophthalates monomers for the polycondensation step to produce high molecular weight linear polyesters from which fibers and films can be produced.

More specifically, the direct esterification process of this invention comprises charging to a reaction vessel wherein the reactants can be agitated and water can be removed from the reaction mixture, a mixture of 2 to 6 moles of the diol per mole of phthalic acid in the high purity terephthalic acid or high purity mixture of terephthalic acid and up to 35% isophthalic acid. Air is removed, for example, by purging with nitrogen or other oxygen-free insert gas and/or alternately evacuating the reaction vessel and purging with an inert oxygen-free gas such as nitrogen. Before heating to reaction temperature, an inert oxygen-free gas such as preferably nitrogen, is charged to a pressure of 15 to 150 pounds per square inch gauge (1 to 10 atmospheres). The mixture of diol and acid is heated to above the normal boiling point of the diol, preferably 50 to 100° C. above the normal boiling point, and the pressure is permitted to increase to substantially the pressure of the inert gas at the reaction temperature. The pressure will, of course, be somewhat higher due to the partial pressure of the diol. The partial pressure of the by-product water formed during the reaction will be negligible since the water is being removed. A preferred method for removing and isolating the by-product water from the esterification reaction mixture is through a side-arm condenser and receiver, both maintained under the pressure of the reaction. The reaction is continued until the reaction mixture is a clear fluid. By this process as much as 99% of the total carboxyl groups can be converted to hydroxy ester groups in 1.0 to 2 hours. A lower conversion, down to 50% of the carboxyl groups, can be achieved in 0.5 to 1.0 hour. Such a mixture will be a clear fluid. The reaction product, ester product, and unreacted diol can be withdrawn and solidified. Solidification is preferably conducted in an oxygen-free atmosphere. The resulting solid product is generally a waxy solid. This solid can be packaged or stored for subsequent use to prepare high molecular weight linear polyesters.

The solid product of the direct esterification will produce an acceptable fiber and film-forming polyester of light color when heated at 760 mm. Hg to 100 mm. Hg while distilling off unreacted diol at a temperature of from the normal boiling point of the diol up to the temperature at which polycondensation is to be carried out. The temperature at which the unreacted diol is distilled off is not critical but should provide as rapid removal of the diol as can be accomplished without excess foaming and entrainment of foam in the vapors. It is preferred to heat and gradually reduce the pressure so that as the diol is removed the mixture can be heated to polycondensation conditions. It is advantageous to employ an inert oxygen-free gas sweep as, for example, by bubbling nitrogen through the mixture while the last portions of unreacted diol are being removed. For polycondensation the temperature is increased to 270 to 300° C. and the pressure is decreased to 0.5 mm. Hg or below, preferably 0.3 to 0.1 mm. Hg. As polycondensation progresses the mixture becomes increasingly viscous. Hence, the agitation of the viscous mixture should be vigorous to aid in the removal of the diol split out. It is also advantageous to heat thin films of the viscous mixture to permit rapid diffusion of the diol through the increasingly more viscous liquid. The increase in viscosity of the polyester product can be followed by means coupled with the agitating device. When the polyester reaches the desired viscosity, the polyester can be extruded, quenched and chipped or extruded through spinnerettes or though a die for film-forming.

A lighter polyester, such as a white polyester, can be prepared by removing the unreacted diol from the hot direct esterification product. This can be done in the same reaction vessel through an attached sidearm condenser or in any separate vessel. It is desirable to keep the hot esterification product in an oxygen-free atmosphere while removing water and unreacted diol. As the pressure is reduced to atmospheric or below, the use of an inert gas purge or blanket will adequately provide an oxygen-free atmosphere. The diol is removed, preferably at reduced pressure from 100 mm. Hg down to 0.5 mm. Hg, as rapidly as is possible without causing excessive foaming and withdrawal of the foam. The ester product can be subjected to polycondensation conditions, 250 to 300° C. and 0.1 to 0.5 mm. Hg, with or without a conventional polycondensation catalyst. The use of a polycondensation catalyst materially reduces the reaction time. However, suitable high molecular weight polyesters can be produced from the ester product obtained from the process of this invention in 5 to 7 hours.

As polycondensation catalysts there can be employed any of the conventional polycondensation catalysts including titanium oxide, titanium tetrafluoride, ferric acetate, litharge, lead oxide, antimony trioxide, organo-tin compounds, organo-manganese halides, and titanium tetraalkoxide and ammonium salts thereof, among others.

Because the direct esterification process of this invention produces an ester product suitable for polycondensation to high quality film and fiber-forming polyesters, it can be integrated into a continuous commercial process for the preparation of the polyesters. Also, a well-integrated batch process for producing polyesters can be made the basis for a commercial process.

Depending upon the polyester produced and the purpose, fiber or film manufacture, or other molded or extruded form for which it is to be used, the polyester, in addition to being as near-white as possible, should be of sufficiently high molecular weight to have an intrinsic viscosity of from 0.3 to 1.2 as is reported in the literature. Intrinsic viscosity is an approximation of molecular weight. It is expressed by the relationship of the viscosity of a dilute solution of the polyester, the viscosity of the solvent (both at the same temperature) and the concentration of the polyester in solution. The expression is:

$$[\eta] = \frac{1}{4C}(N_r - 1 + 3 \ln N_r)$$

wherein $[\eta]$ is the intrinsic viscosity, $N_r$ is the flow time of a dilute solution of the polyester divided by the flow time of the solvent, both taken at the same temperature, and C is the concentration of the polyester in the dilute solution in grames per 25 milliliters of solution. This expression, the Billmeyer equation, is only accurate when the polymer concentration is between 0.0970 and 0.1030 gram per 25 ml. Acceptable intrinsic viscosity as reported in the literature may be in the range of from 0.3 to 1.2. For fiber and film formation, polyethylene terephthalate for fibers, in addition to melting at 265.0° C. or above, should also have an intrinsic viscosity above 0.5, desirably 0.6 and above and preferably in the range of 0.6 to 0.7. For film preparation the intrinsic viscosity can be in the range of 0.3 to 0.6, desirably above 0.4 and preferably 0.4 to 0.5 for polyethylene terephthalate.

The polymer resulting from polycondensation when extruded as ribbons or small rods and cooled quickly is a glass-like super-cooled liquid (sometimes referred to as amorphous) which crystallizes on heating to about 100° C. In such a form it is not satisfactory for fiber and film preparation. In this form it is usually cut into chips, remelted and then either spun into fiber filaments and oriented by drawing, or extruded or cast into sheets and then drawn to orient and heated to stabilize the film. Alternatively, the molten polymer, as produced by this process, can be directly extruded to produce fibers, films or other forms.

The following examples will illustrate the process of this invention both with respect to the direct esterification under imposed pressure and to the integrated process through polycondensation.

*Example I*

To a closed reaction system comprising an esterification reaction vessel having an agitator, a side-arm condenser and condensate receiver there are charged ethylene glycol and high purity terephthalic acid (DMF color 5, TEG color 50, 4-carboxybenzaldehyde content less than 0.1%) in the ratio of 3 moles of glycol per mole of terephthalic acid. The mixture is degassed while agitating by alternately sweeping with nitrogen and evacuating. Thereafter the reaction system is closed and charged with nitrogen to 50 p.s.i.g. (about 4.3 atmospheres). The glycol-terephthalic acid mixture is heated rapidly to 260° C. with agitation. The pressure increases to about 100 p.s.i.g. In about 0.75 to 1.0 hour the reaction mixture is a clear fluid and about 50% of the total carboxyl groups is converted to hydroxyethyl ester groups. In less than about 2 hours more than 99% of the carboxy groups is converted to hydroxyethyl ester groups. The water collected in the condensate receiver is removed. The pressure is reduced as rapidly as possible through the condenser without entraining foam. When the pressure is about 2 p.s.i.g. (0.1 atmosphere), nitrogen is bubbled into the liquid esterification product. Bleed in of nitrogen is continued, a reduced pressure is applied to the system to reduce the pressure of 0.5 mm. Hg and the esterification product is heated to 280° to 285° C. as rapidly as possible. The excess glycol is removed in about 35 to 45 minutes. Thereafter the glycol terephthalate remaining in the reaction vessel is maintained at 280 to 285° C. and 0.5 to 0.3 mm. Hg and vigorously agitated while removing the glycol split out during polycondensation. The increase in viscosity of the polyester forming may be followed by external or internal measuring means until the polyester of the desired properties is obtained. A white polyethylene terephthalate (after crystallizing at 100° C.) having an intrinsic viscosity of 0.6 and above, melting at least at 265° C., may be obtained in 1 to 3 hours. The over-all time from esterification through polycondensation may be from 3 to 6 hours.

*Example II*

The process of Example I is repeated except the esterification product after about 2 hours of reaction time is cooled while blanketed with nitrogen and crystallized. The waxy, white solid product melts at about 100° C.

*Example III*

The waxy solid product of Example II is melted in the presence of nitrogen in a polycondensation vessel. The melt is agitated vigorously, nitrogen bubbled therethrough and heated to 280–285° C., while reducing the pressure in the polycondensation vessel to 0.5 mm. Hg. These temperatures and pressures are maintained for about three hours. The resulting polyethylene terephthalate is light in color but may not be as white as the polyester of Example I.

A lighter polyester can be obtained by proceeding directly with the glycol removal and polycondensation after the direct esterification rather than first recovering a solid ester product.

*Example IV*

The process of Example III is repeated except that 0.1% of polycondensation catalyst based on the esterification product is employed and the reaction time is about two hours. A resulting polyethylene terephthalate may be obtained having a melting point of at least 265° C., a light straw color and an intrinsic voscosity of about 0.7.

*Example V*

A continuous direct esterification process employing the process of this invention would be carried out in the following manner. A slurry containing equal parts by weight of ethylene glycol and finely divided high purity terephthalic acid (mole ratio about 3 to 1) is continuously prepared by continuously combining the glycol and terephthalic acid. The slurry is agitated to keep the terephthalic acid suspended. The slurry is continuously pumped into a degassing chamber under reduced pressure where it is agitated, nitrogen is bubbled through the slurry and reduced pressure is maintained to remove entrained air. The degassed slurry is pumped into a battery of glass-lined esterification kettles, each operated as a batch esterification but so scheduled that there is substantially continuous charging of the slurry. Each esterification kettle has an agitator and is attached to a sidearm condenser and receiver as part of a closed system. Prior to charging of the degassed slurry, nitrogen to 50 p.s.i.g. is charged into the empty esterification kettle. When all of the batch has been charged to the kettle, it is heated rapidly to about 260° C. The pressure at 260° C. is about 100 p.s.i.g. The degassed slurry may also be preheated to 260° C. before charging to the nitrogen pressurized esterification vessel. The slurry is maintained at 260° C. and 100 p.s.i.g. with agitation for about one hour. The entire reaction mixture is a clear fluid. The aqueous condensate is removed. The unreacted glycol is removed as, for example, by flashing the pressurized reaction product to atmospheric pressure to 500 mm. Hg while condensing glycol. The remainder of the esterification reaction product is continuously pumped into a crystallizer and solid hydroxyethyl terephthalate product is recovered. The hot ester product after removal of glycol may be cooled by employing it to preheat partially the degassed slurry.

The solid ester product may be remelted in an oxygen-free atmosphere; e.g., nitrogen, heated to 280–300° C. and converted to polyethylene terephthalate, for example by charging to a prepolymer tower similar to a bubble plate distillation column operated at a minimum pressure of 10.0 mm. Hg and an over-all temperature of 280 to 285° C. where the polycondensation is carried out to produce a polyester having an intrinsic viscosity of about 0.2 to 0.3, a residence time of 0.5 to 1.5 hours being satisfactory. These prepolymer towers are charged at the bottom, the glycol split out is withdrawn from the vapor space at the top and liquid prepolymer is withdrawn from the top tray. The prepolymer is charged to a continuous polymerizer where the liquid, while becoming increasingly viscous, is vigorously agitated by mechanical means and by bubbling of nitrogen through the liquid. It is advantageous to have a high ratio of heat transfer surface to volume of liquid during the completion of the polycondensation which is conducted at 280 to 300° C. and from 0.1 to 10 mm. Hg, preferably below 1.0 mm. Hg to even as low as 0.3 to 0.5 mm. Hg. To provide the high ratio of heat transfer surface to volume of liquid, heated baffles as well as heated agitators may be employed. The baffle surfaces and agitator surfaces may be so arranged as to provide thin films on the heated surfaces to aid in the diffusion of split out glycol through the viscous liquid. The polyester can be continuously withdrawn after a residence time of about 3 to 5 hours. The completion of polycondensation is also carried out in an inert oxygen-free atmosphere; e.g., nitrogen or carbon dioxide.

Polyethylene terephthalate may be produced by this process having an intrinsic viscosity of 0.6 to 0.7 and melting at 265° C. A lower intrinsic viscosity polyester for film production of intrinsic viscosity of 0.5 to 0.6 may be produced in 2 to 3 hours after the prepolymer tower.

During laboratory experiments it has been observed that during polycondensation after a polyester is formed corresponding to that produced in a prepolymer column, the liquid polyester product creeps up the agitator, then is spun off the agitator blades to the reactor side walls, and flows down the walls to the reaction mixture. A polycondensation reactor taking advantage of this creeping flow of the viscous polyester can be employed for the continuous polyesterification, especially following the prepolymer tower.

In such a continuous process following the prepolymer tower, the polyester of intrinsic viscosity of up to about 0.1 is fed to bottom of a vertical tubular reactor having a centrally located agitator shaft upon which is mounted a plurality of agitator blades. Near the top of the tubular reactor the vapor space is connected to a source of vacuum. A collecting ring is located below the level of the top agitator blade on the inner wall of the reactor tube. The reactor tube is surrounded by a heating medium to maintain a reaction mixture at 280–285° C. Pressure in the tube is maintained at 0.2 to 0.5 mm. Hg. Nitrogen is also charged to the bottom of the tube and through the liquid in the bottom thereof. As the viscosity of the polyester increases, the viscous liquid polyester creeps up the rapidly turning agitator until it reaches the desired viscosity. The polyester is then continuously thrown into the collecting ring or on the wall above the collecting ring. The finished polymer is withdrawn from a reservoir to which the collecting ring discharges. The height of the top agitator blade and consequently the collecting ring will be dependent upon the polyester being prepared, the desired degree of polycondensation; i.e., whether the polyester is for film or fiber production, and the reaction temperature. A blade diameter, tip of one blade to the tip of the opposite blade, of from 0.5 to 0.8 times the diameter of the reactor tube will be adequate for the design of such a continuous lift-type polymerizer. A height above the lower liquid level to the upper blade to provide a residence time of about 2 hours will be satisfactory for the production of polyethylene terephthalates of intrinsic viscosities of from 0.6 to 0.7.

*Example VI*

A mixture of the hydroxyethyl esters of terephthalic acid and isophthalic acid suitable for subjecting to a polycondensation reaction after removal of unreacted glycol to prepare a high molecular weight linear polycoester product having an incipient melting point of 229 to 230° C. and an intrinsic viscosity of 0.6 to 0.7 from which a film may be prepared, may be obtained according to the process of this invention in the following manner.

A degassed (air and oxygen-free) slurry containing 3 moles of ethylene glycol per mole of phthalic acid in a mixture containing 95% terephthalic acid and 5% isophthalic acid by weight (DMF color of 5, TEG color of 100 and carboxybenzaldehyde content of less than 0.5%) is charged to an esterification vessel similar to that hereinbefore described, and pressurized with nitrogen to 60 p.s.i.g. The mixture is agitated and heated to 255–260° C. for about 1.5 hours during which time the reaction mixture becomes a clear fluid and by-product water is removed from the reaction mixture. The resulting mixture contains hydroxyethyl terephthalate (95%) and hydroxyethyl isophthalate (5%) substantially as the diesters; i.e., about 95 to 99% of the total carboxyl groups converted to hydroxyethyl ester groups and about one mole of unreacted ethylene glycol per mole of ester. This product of the direct esterification can be removed and recovered per se for future conversion to a polyester or can be subjected to polycondensation without separate recovery.

To accomplish the latter, the mixture is flashed to about 10 to 20 mm. Hg in a vessel purged with nitrogen to be oxygen-free to remove the unreacted glycol. The residue, the mixture of esters, is transferred to a glass-lined polycondensation vessel equipped with a stirrer, a dip tube for adding nitrogen and is attached to a vacuum source through a condenser. The ester mixture is rapidly heated to 285° C. at 0.5 mm. Hg and vigorously stirred while nitrogen is bubbled into the liquid. Glycol split out during the polycondensation is removed and condensed. When the viscosity of the polymer melt as measured by external means indicates that the desired high molecular weight polyester is formed, about 3 to 5 hours, the mixture is tempered at 120 to 140° C. for several hours in the presence of nitrogen. Thereafter the polymer in the melt state is extruded to form an amorphous film which can be drawn into an oriented film in the usual manner.

*Example VII*

The process of Example VI is repeated except a mixture of 65% terephthalic acid and 35% isophthalic acid of the same high purity is employed. A high molecular weight linear poly-coester having an incipient melting point of 153 to 155° C. and an intrinsic viscosity of 0.6 to 0.7 may be prepared from the resulting mixture containing hydroxyethyl esters of terephthalic acid (65%) and isophthalic acid (35%).

By the process of Example I, a reaction product containing 4-hydroxycyclohexyl terephthalates can be prepared from 1,4-quinitol and high purity terephthalic acid, 4-methylcyclohexyl terephthalates can be prepared from 1,4-dimethylol cyclohexane (cis form) and high purity terephthalic acid, and 4-methylolphenyl terephthalates can be prepared from $\alpha,\alpha'$-dihydroxy-p-xylene and high purity terephthalic acid. Linear polyesters of high molecular weight may be readily prepared from these hydroxy ester monomers in the manner hereinbefore described with only minor modifications, taking into account the known nature of these polymers, some of which are higher melting than polyethylene terephthalates.

When terephthalic acid and mixtures of terephthalic acid with up to 35% isophthalic acid of substantial lesser purity than hereinbefore defined as high purity are employed in the direct esterification process of this invention, excessively long reaction times are required to obtain an ester product wherein there is substantially no free terephthalic acid. Such an ester product is rather dark in color. Furthermore, polyesters prepared from such low quality esters even in the presence of a catalyst are dark in color, lack uniformity when spun into filaments and have melting points below that acceptable for film and fiber preparation.

What is claimed is:

1. A process for the direct esterification of a phthalic acid whose carboxyl groups are separated by at least three ring carbon atoms and said phthalic acid contains at least 65% terephthalic acid and less than 0.1 percent carboxybenzaldehydes by weight with a diol whose molecule contains 2 to 10 carbon atoms and, other than the two hydroxy groups, contains only carbon and hydrogen atoms, to an ester product suitable for conversion to a drawable film or fiber-forming polyester which comprises charging to the reaction zone of a closed system including separate reaction zone, condensation zone and condensate collecting zone, a mixture containing 2 to 6 moles of said diol for each mole of said phthalic acid, excluding from said closed system substantially all oxygen, imposing in said closed system an oxygen-free inert gas pressure of from about 1 to 10 atmospheres at the ambient temperature, agitating and heating the resulting mixture in said reaction zone to a temperature in the range of 200 to 300° C. at the pressure generated in said closed system, condensing water of the esterification reaction and a portion of the excess diol, removing the resulting condensate to said condensate collection zone separate from said reaction zone until a clear fluid product is obtained wherein at least 50% up to 99% of the total carboxyl groups of said phthalic acid has been converted to hydroxy ester groups.

2. The process of claim 1 wherein the mixture charged to said reaction zone consists essentially of from 3 to 5 moles of said diol for each mole of said phthalic acid and a catalytically effective amount of a transesterification catalyst.

3. The process of claim 1 wherein the mixture charged to said reaction zone consists essentially of from 3 to 5 moles of said diol for each mole of said phthalic acid.

4. The process of claim 1 wherein the pressurizing oxygen-free gas is nitrogen.

5. The process of claim 1 wherein the diol is para-dimethylol benzene.

6. The process of claim 1 wherein the diol is 1,4-dimethylol cyclohexane.

7. The process of claim 1 wherein the diol is a polymethylene diol containing 2 to 10 methylene groups.

8. The process for the preparation of a hydroxyethyl terephthalate product suitable for conversion to a drawable fiber and film-forming polyethylene terephthalate which comprises charging to a reaction zone of a closed system including separate reaction zone, condensation zone and condensate collection zone, a mixture containing 2 to 6 moles of ethylene glycol for each mole of a high purity terephthalic acid having a 4-carboxybenzaldehyde content of less than 0.1 percent, excluding from said closed system substantially all oxygen, imposing in said system a nitrogen pressure of from 1 to 10 atmospheres at the ambient temperature, agitating and heating the resulting mixture in said reaction zone to a temperature in the range of from 250° to 280° C. at the autogenic pressure generated in said closed system, condensing water of esterification and a portion of the excess glycol at said pressure, removing the resulting condensate to said condensate collecting zone at said pressure separate from said reaction zone until a clear fluid product is obtained wherein at least 50% up to 99% of the total carboxyl groups of said terephthalic acid have been converted to hydroxyethyl ester groups.

9. The process of claim 8 wherein the mixture charged to the reaction zone consists essentially of 3 to 5 moles of ethylene glycol for each mole of terephthalic acid and a catalytically effective amount of a transesterification catalyst and the resulting ester product is removed from said reaction zone and solidified in the presence of oxygen-free nitrogen to a temperature of from 20 to 30° C.

10. The process of claim 8 wherein the process is non-catalytic, the reaction mixture charged to the reaction zone is a degassed slurry consisting essentially of 3 to 5 moles of ethylene glycol for each mole of terephthalic acid, the clear fluid ester product is withdrawn and cooled in an atmosphere of oxygen-free nitrogen to a temperature of from 20° to 30° C.

11. A continuous process for preparing a hydroxyethyl terephthalate suitable for conversion to drawable fiber and film-forming polyethylene terephthalate which comprises charging continuously to a reaction zone in a closed system including separate reaction zone, condensation zone, condensate receiving zone and product receiving zone, all being pressurized with oxygen-free nitrogen and all being under a total pressure of 6 to 8 atmospheres, a degassed slurry containing 3 to 5 moles ethylene glycol for each mole of terephthalic acid containing less than 0.1% 4-carboxybenzaldehyde heated to about 260° C., said reaction zone containing the clear fluid product substantially free of water resulting from the reaction of 3 to 5 moles of ethylene glycol for each mole of said terephthalic acid at 260° C. and 6 to 8 atmospheres until at least about 85% to 99% of the total carboxyl groups of said terephthalic acid has been converted to hydroxyethyl ester groups, continuously condensing water formed during the esterification together with a minor portion of the excess glycol, continuously collecting said condensate, continuously withdrawing from the lower portion of said reaction zone to said product receiving zone a portion of said ester product, the charging to and withdrawal from said reaction zone being regulated to provide a residence time in said reaction zone of from about one-half to three hours, said withdrawn ester product being characterized by being fluid at 260° C. and contains an ester product wherein 85 to 99% of the total carboxyl groups of said terephthalic acid is converted to hydroxyethyl groups.

12. A continuous process for preparing polyethylene terephthalate of intrinsic viscosity of 0.6 to 0.7 which comprises charging continuously to a reaction zone in a closed system including separate reaction zone, condensation zone, condensate receiving zone and product receiving zone, all being pressurized with oxygen-free nitrogen and all being under a total pressure of 6 to 8 atmospheres, a degassed slurry containing 3 to 5 moles ethylene glycol for each mole of terephthalic acid containing less than 0.1% 4-carboxybenzaldehyde heated to about 260° C., said reaction zone containing the clear fluid product substantially free of water resulting from the reaction of 3 to 5 moles of ethylene glycol for each mole of said terephthalic acid at 260° C. and 6 to 8 atmospheres until at least about 85% to 99% of the total carboxyl groups of said terephthalic acid has been converted to hydroxyethyl ester groups, continuously condensing water formed during the esterification together with a minor portion of the excess glycol, continuously collecting said condensate, continuously withdrawing from the lower portion of said reaction zone to said product receiving zone a portion of said ester product, the charging to and withdrawal from said reaction zone being regulated to provide a residence time in said reaction zone of from about one-half to three hours, said withdrawn ester product being characterized by being fluid at 260° C. and contains an ester product wherein 85 to 99% of the total carboxyl groups of said terephthalic acid is converted to hydroxyethyl groups, continuously removing the excess ethylene glycol from the withdrawn ester product at reduced pressure of down to 2 mm. Hg, continuously heating the residue in an oxygen-free atmosphere at 280° C. to 300° C. at 0.5 to 0.1 mm. Hg to an intrinsic viscosity of 0.6 to 0.7, continuously withdrawing and cooling said polyethylene terephthalate.

References Cited by the Examiner
UNITED STATES PATENTS

| 2,465,319 | 3/49 | Whinfield | 260—75 |
| 2,641,592 | 6/53 | Hofrichter | 260—75 |
| 2,855,432 | 10/58 | Binder | 260—475 |
| 2,855,432 | 10/58 | Binder | 260—475 |
| 3,047,621 | 7/62 | Tate | 260—75 |
| 3,050,533 | 8/62 | Munro et al. | 260—75 |

FOREIGN PATENTS

| 296,787 | 2/30 | Great Britain. |
| 727,790 | 4/55 | Great Britain. |
| 777,628 | 6/57 | Great Britain. |

WILLIAM H. SHORT, Primary Examiner.

MILTON STERMAN, P. E. MANGAN, LOUISE P. QUAST, Examiners.